Feb. 17, 1953 G. M. WICK 2,628,496
PORTABLE GOLF BALL TESTER
Filed April 12, 1950 2 SHEETS—SHEET 1

INVENTOR.
George Malcolm Wick,
BY George D. Richards
Attorney

Feb. 17, 1953 — G. M. WICK — 2,628,496
PORTABLE GOLF BALL TESTER
Filed April 12, 1950 — 2 SHEETS—SHEET 2

INVENTOR.
George Malcolm Wick,
BY George D. Richards
Attorney

Patented Feb. 17, 1953

2,628,496

UNITED STATES PATENT OFFICE 2,628,496

PORTABLE GOLF BALL TESTER

George Malcolm Wick, Ridgewood, N. J.

Application April 12, 1950, Serial No. 155,481

2 Claims. (Cl. 73—94)

This invention relates to a portable device by means of which golf balls can be tested with respect to their compressible resiliency and also with respect to normal sphericity.

The invention has for its primary object to provide a simple compact and yet highly efficient device for testing the compression and resilient reaction of a golf ball; the device being also operative at the same time to indicate any deformation of the ball with respect to its normal spherical shape.

The invention has for another object to provide a golf ball tester for purposes stated which includes means for subjecting the tested ball to compression while it is supported by a resiliently flexible circular ring which conforms to its normal circular perimeter; said compression testing means being operative to actuate indicator means with reference to a graduated scale denoting the degree of compression in pounds; said scale including, if desired, other ball condition denoting indicia.

The invention has for a further object to provide a golf ball tester for the purposes described which is of small bulk so that the same can be carried about in the user's pocket or in the pocket of a golf club bag, thus being quickly available for use even during play of the game, whereby the ball can be tested from time to time as play therewith progresses.

Other objects and advantages of this invention will become apparent as the following description is read in connection with the accompanying drawings, in which.

Similar characters of reference are employed in the above described views, to indicate corresponding parts.

Figure 1:
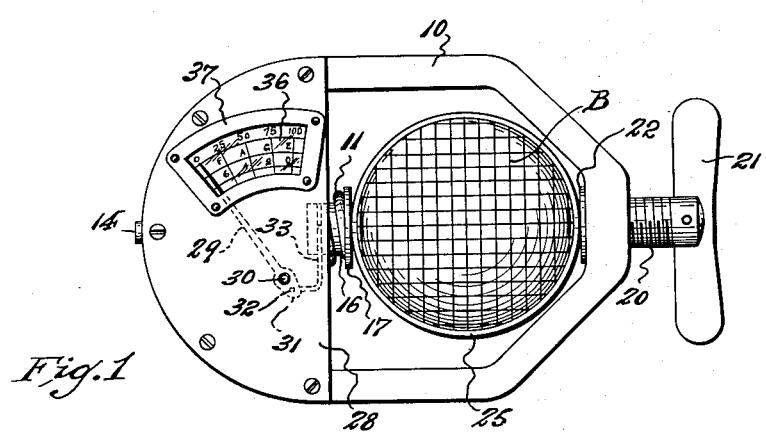
Fig. 1 is a plan view of the novel portable golf ball tester of this invention.
Figure 2:
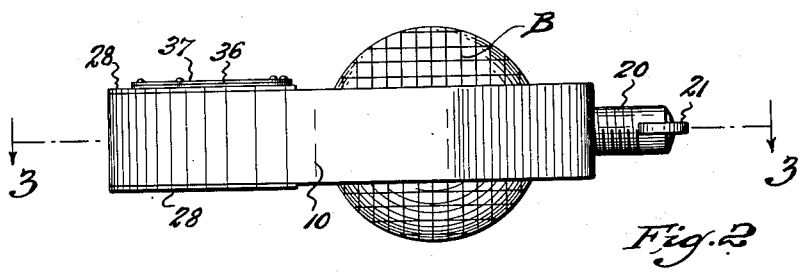
Fig. 2 is a side elevational view of the same.
Figure 3:
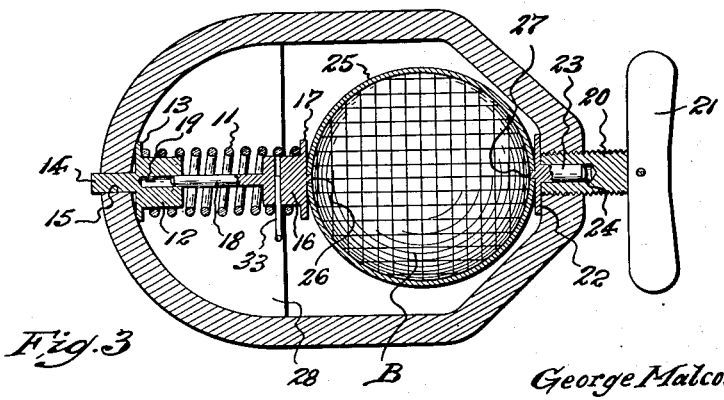
Fig. 3 is a horizontal sectional view thereof, taken on line 3—3 in Fig. 2.

Before describing the detail construction and mode of operation of the testing device of this invention, it may be well to briefly mention the qualities of a golf ball which are essential to good performance thereof in use. In the first place, the ball must possess good elastic compressibility when struck by a club, which includes the ability to quickly resiliently react after club impact, since upon this factor depends, to a large extent, the ability of the struck ball to attain maximum flight distance. A golf ball having ability to quickly react and return to its normal spherical shape after compression of approximately 90 pounds under club impact, will sustain a flight over a comparatively long distance, e. g. an average of 230 yards. Assuming a club impact of equal force, if the ball compression drops, the resultant ball flight is substantially reduced; e. g. at a tested compression of 60 pounds, the ball flight will be reduced, and will approximate but 200 yards, and at a tested compression of 30 pounds, the ball flight will be further reduced, and will approximate but 170 yards. Of course, the player should study the reaction of his ball and, being acquainted with its elastic compressibility factor, can then adjust the applied force of his club stroke according to distance desired to be gained on a given play.

Another factor which is important with respect to attainment of true and straight direction of ball flight after club impact is that the ball be, initially, of true spherical shape, and capable of resuming such shape upon reaction from compression caused by club impact. If a ball becomes deformed from true spherical shape, or becomes lop-sided, it will tend to spin during flight, and will thus be caused to veer off and away from the intended flight direction.

Since both compressible resiliency and sphericity of a ball are subject to change under constant use, and even during the round of a single game, it is important for the player to gain accurate knowledge of the ball condition, for upon such condition frequently depends the ultimate score and avoidance of unnecessarily accumulated strokes.

For the above reasons it will be obvious that a portable ball testing device, which is available for use not only to test balls for selection preliminary to play (for even new balls and balls of different makes will vary as between themselves with respect to their compressible resiliency), but also for testing balls during play, will be found to afford real assistance in improving the player's game. To this end, the novel portable testing device of this invention, now to be described, has been devised.

Referring now to the drawings, the novel portable golf ball tester of this invention comprises a rigid open body frame 10 of generally elliptical shape. Mounted within the body frame 10, in alignment with its longitudinal axis, is a tensionally compressible tester coil spring 11, one end of which is telescopically engaged over a seating boss 12, said boss having an annular flange 13 upon which an end of said spring is footed. Said seating boss 12 is suitably connected with one end of the body frame 10, and for this purpose is preferably provided with a retaining stem or lug 14 which extends outwardly through an opening 15 with which said end of the body frame is provided, thus securely anchoring the seating boss 12 to the body frame against lateral displacement. The opposite end of the tester spring 11 is telescopically engaged over a seating boss 16, this boss also having an annular flange 17 upon which said opposite end of the spring 11 is footed. Preferably the seating boss 16 is provided with an axially projecting aligner stem 18, the free end of which slidably engages an axial bore 19 with which the seating boss 12 is provided, whereby, said boss 16, although free to move toward and from the stationary boss 12 as the tester spring contracts and expands, is held against lateral displacement from aligned relation to the latter, and the tester spring is likewise held against lateral shift.

Threaded through the opposite end of the body frame 10, in alignment with the longitudinal axis thereof, and thus in axially aligned relation to the tester spring 11, is a manipulatable pressure exerting screw 20 having a transverse finger piece 21 affixed to its outer end. Mounted on the inner end of the pressure exerting screw is a thrust plate 22 which is provided with a rearwardly projecting axial pivoting stem 23 which is rotatably engaged in a bore 24 which enters into the inner end portion of said screw 20, thus providing a swiveling connection between said screw and said thrust plate.

Mounted between the seating boss 16 and the thrust plate 22 is a resiliently flexible ball supporting and ball perimeter testing ring 25, which is diametrically aligned with the axis of the pressure exerting screw 20 and the tester spring 11. Said ring 25 comprises a resiliently flexible, circular steel band of suitable width, the internal diameter of which corresponds to the external diameter of a golf ball of normal true sphericity. Said testing ring 25 is supported at diametrically opposite points by coupling projections or lugs 26 and 27 which respectively project from the seating boss 16 and from the thrust plate 22. When the pressure exerting screw 20 is turned to normal initial retracted position, so that the thrust plate 22 abuts the frame body 10 (see Fig. 1), the tester spring 11 will be relaxed and expanded to a normal initial condition. Under these circumstances, the testing ring 25 will assume its true circular form (also see Fig. 1), and the device is in normal condition ready for reception of a ball B desired to be tested.

In the use of the testing device, a ball B to be tested is inserted within and so as to be held by the perimeter testing ring 25, which ring, in its then initial true circular condition, serves as a means for indicating whether or not the ball possesses a true circular perimeter; such test being made by rotating the ball within the ring. While the ball is supported within the embrace of the testing ring, the device is manipulated for testing the resilient compressibility and reaction of the ball. This is done by turning inward the pressure exerting screw 20. As said screw 20 is turned, it transmits, through the thrust plate 22 and against the resisting tension of the tester spring 11, a compressional or squeezing force which is exerted diametrically of the test ring 25 and of the ball B embraced by the latter. The force thus applied is similar in effect to the compression of the ball which results from the driving impact of a golf club upon the ball.

The support of the ball by the resiliently flexible ring 25, during application of testing compressional force to the ball, is of considerable advantage. If the thrust elements 20 and 16 were permitted to solely bear against the ball service, the force applied thereby at diametrically opposite points of the ball surface in a limited area thereof, involves risk that the surface of the ball might be detrimentally indented, thus permanently deforming the ball from desired true sphericity. The presence of the ring 25 avoids such risk, since the concavity of said ring, which closely and firmly embraces the convexity of the ball surface at areas beyond and radial to the points of force application, serves to distribute the applied force over a considerably greater area than that area thereof aligned and opposed to the thrust elements 16 and 20. As a result of such radial distribution of the compressional force relative to the limited points of its application, concentrated application of said force is avoided and risk indentation of the ball surface likely to effect permanent deformation of the ball sphericity is prevented.

The tester spring 11 is substantially enclosed between cover plates 28 which are affixed to opposite sides of the tester spring supporting end portion of the body frame 10. The tester spring is suitably calibrated so that it will compress proportionally to the amount of compressional force which is applied to the tested ball B by the screw 20. Means, responsive to the compressional movement of the tester spring 11, is provided for visually indicating the amount of compressing force which is applied to the ball by the screw 20. This means comprises an indicator hand or pointer member 29 which is pivotally connected at 30 to a cover plate 28, preferably contiguous to the under or inner face of the latter. Said indicator hand or pointer member 29 is provided, in opposite projection from its pointing end, with an actuating arm 31 to which is pivotally connected one end 32 of a thrust link, the opposite end 33 of which passes between convolutions of the tester spring 11, and is operatively engaged with the tester spring seating boss 16, so as to partake of movement imparted to the latter. Suitably supported from the last mentioned cover plate 28, in parallel plane spaced relation thereto, so as to underlie the free or pointing end of the indicator hand or pointer member 29, is a scale plate 34. Said cover plate 28 is provided with an opening 35 through which the scale plate 34 and indicator hand or pointer member 29 can be observed. Preferably this opening 35 is covered by a transparent panel 36 which is secured to the cover plate 28 by a holding frame 37.

Figure 4:
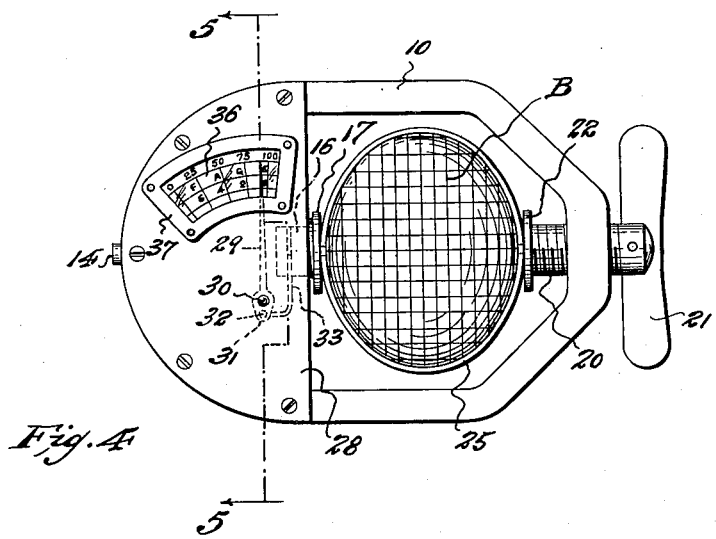
Fig. 4 is a plan view of the tester, similar to that shown in Fig. 1, but illustrating the operative manipulation of the same when testing a golf ball.
Figure 5:
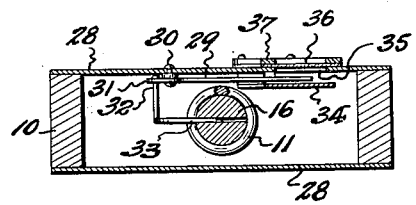
Fig. 5 is a transverse vertical sectional view, taken on line 5—5 in Fig. 4.

The scale plate is suitably inscribed with a scale graduated to indicate degree of compressional force in pounds which is applied to the tested ball B. The scale may also include other data correlated to the applied force indicia, such e. g. as additional indicia denoting quality of the ball, e. g. as "Fair," "Average," "Good" or "Excellent," and/or indicia indicating the probable number of strokes likely to be wasted in play of a ball of less than execellent quality (see Figs. 1 and 4).

In operation of the testing device, as the amount of compressional force applied to the tested ball B is increased, the indicator hand or pointer member 29 will be moved clockwise over the scale plate 34 from its zero position at the left of the latter.

While the ball B under test is subject to applied compressoinal force, it will be noted its perimeter is constantly subjected to the embrace of the testing ring 25, so that the ball will be but temporarily symmetrically deformed.

After a ball B is submitted to a compressional force of e. g. 30 pounds by scale indication, and then the pressure exerting screw is retracted to release the ball from such applied force, the testing ring will resume its true circular shape, whereupon it can be observed whether the ball, under its resilient reaction from compressional force of such amount, also returns to its true sphericity. If it does not, the ball is of poor quality. Such testing may be continued by increasing the amount of applied force, by suitably integrated steps if desired, and then similarly observing the reaction of the ball therefrom. In this manner, the quality of the ball can be quickly determined with reasonable accuracy, as will be understood.

Having now described my invention, I claim:

1. A portable golf ball tester comprising an open body frame, a compressible tester spring means mounted within said frame at one end thereof, a manipulatable pressure exerting screw threaded through the opposite end of said frame in axially aligned relation to the tester spring means, a normally circular, flexibly resilient ring for the reception and closely embracing support of a ball to be tested, said ring being diametrically aligned between the tester spring means and screw, means to couple one side of the ring to the tester spring means, means to couple the opposite side of the ring to the screw, and means cooperative with the tester spring means, ring and screw assembly for visually indicating the amount of compressional force applied to the ring supported ball.

2. A portable golf ball tester comprising an open body frame, a compressible tester spring within said frame at one end thereof, a seating boss affixed to the frame by which said tester spring is footed, a second seating boss with which the free end of the tester spring is engaged, said seating bosses having cooperative telescopically engaged means for retaining the same in axially aligned relation subject to relative axial movement, a manipulatable pressure exerting screw threaded through the opposite end of said frame in axially aligned relation to the tester spring, a normally circular, flexibly resilient ring for the reception and closely embracing support of a ball to be tested, said ring being diametrically aligned between the tester spring and screw, means to couple one side of the ring to said second seating boss, a thrust plate in swiveling connection with the inner end of the screw, means to couple the opposite side of the ring to said thrust plate, and means cooperative with the tester spring, ring and screw assembly for visually indicating the amount of compressional force applied to the ring supported ball.

GEORGE MALCOLM WICK.

REFERENCES CITED

The following references are of record in the file of this patent:

UNITED STATES PATENTS

| Number | Name | Date |
|---|---|---|
| 1,630,110 | Cole | May 24, 1927 |
| 1,819,232 | Cropper | Aug. 18, 1931 |
| 2,041,869 | Smith et al. | May 26, 1936 |
| 2,125,483 | Blanchard | Aug. 2, 1938 |
| 2,278,416 | Atti | Apr. 7, 1942 |

FOREIGN PATENTS

| Number | Country | Date |
|---|---|---|
| 119,001 | Switzerland | Aug. 1, 1927 |
| 547,387 | France | Sept. 20, 1922 |
| 575,099 | France | Apr. 12, 1924 |